Oct. 28, 1969   J. E. WHITE   3,475,722
METHOD AND APPARATUS FOR ACOUSTIC BORE HOLE LOGGING
USING ACOUSTIC SIGNALS OF CONTROLLED DIRECTION
Filed Nov. 7, 1968   4 Sheets-Sheet 1
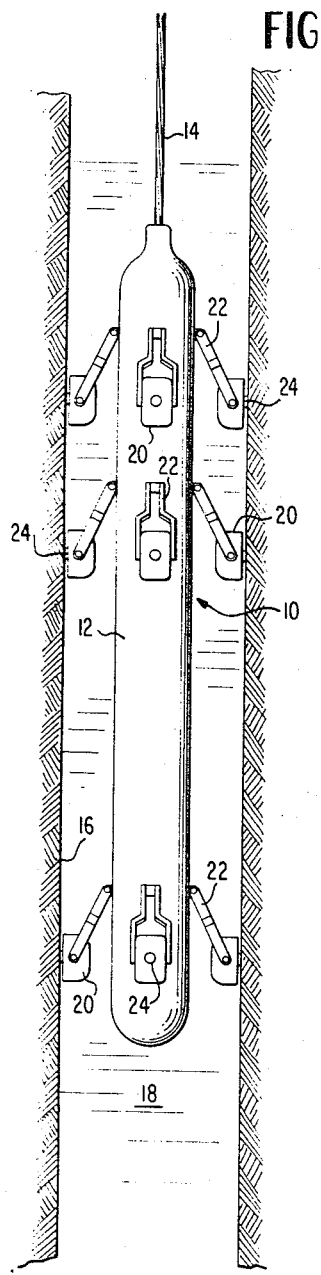
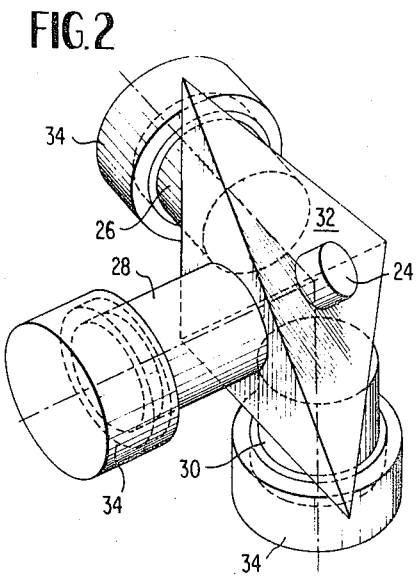
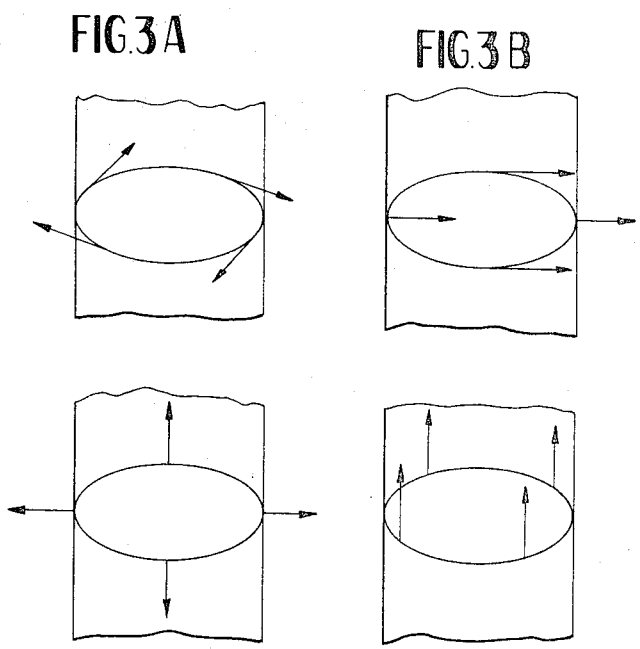
INVENTOR
JAMES E. WHITE
BY
Sughrue, Rothwell, Mion, Zinn & Macpeak
ATTORNEYS

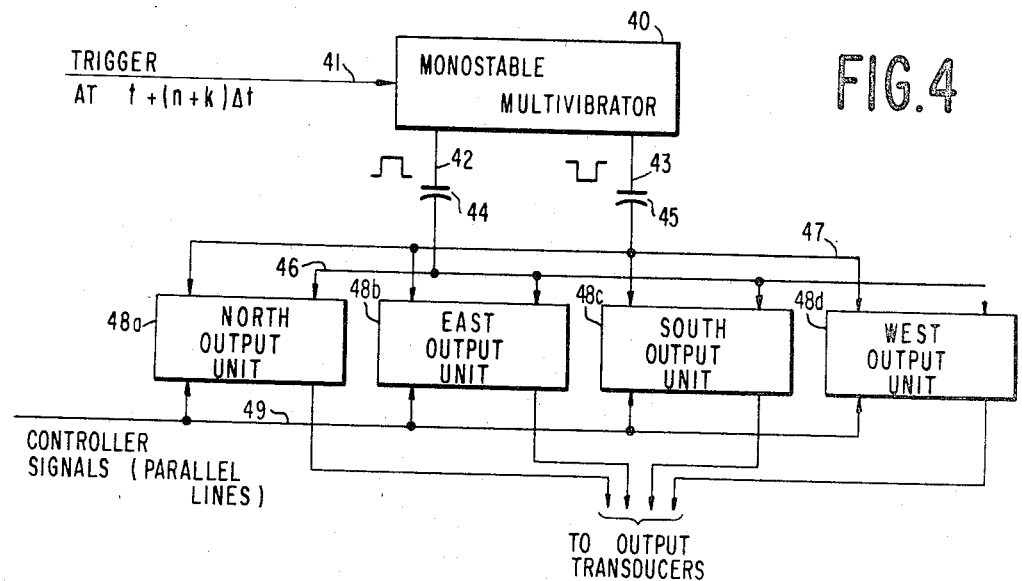
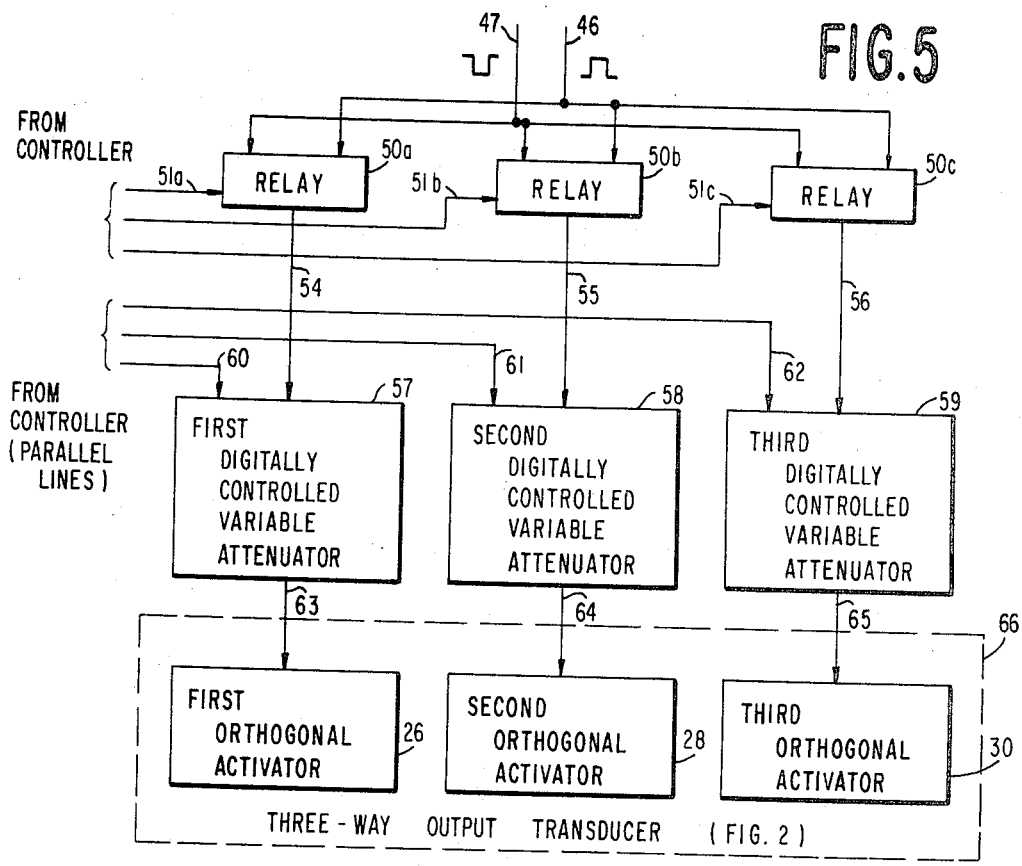

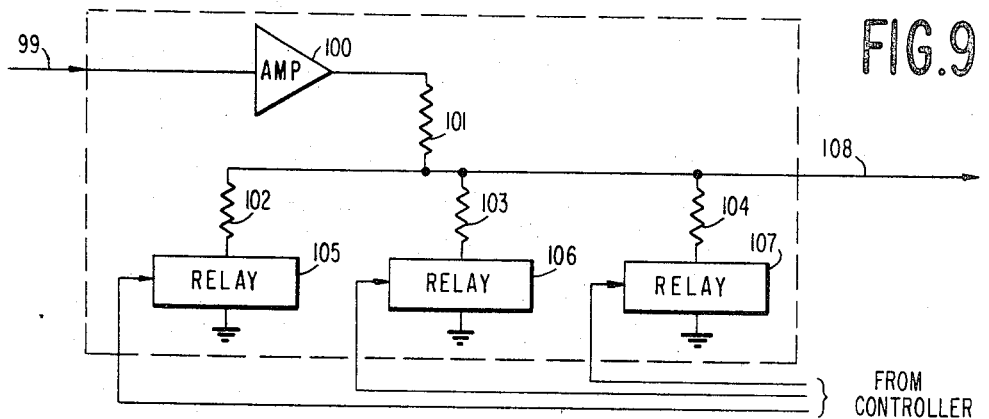
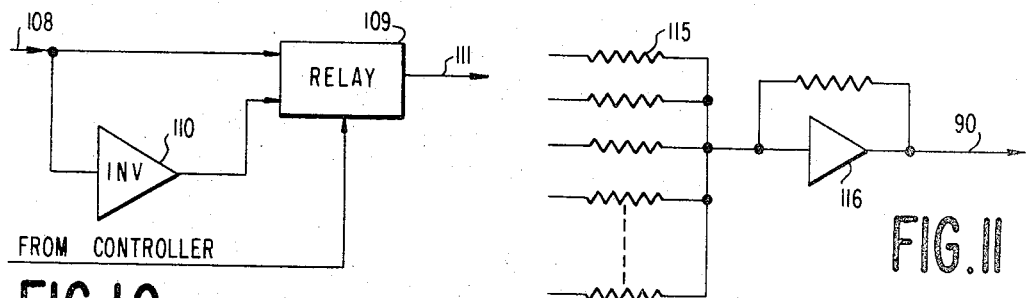
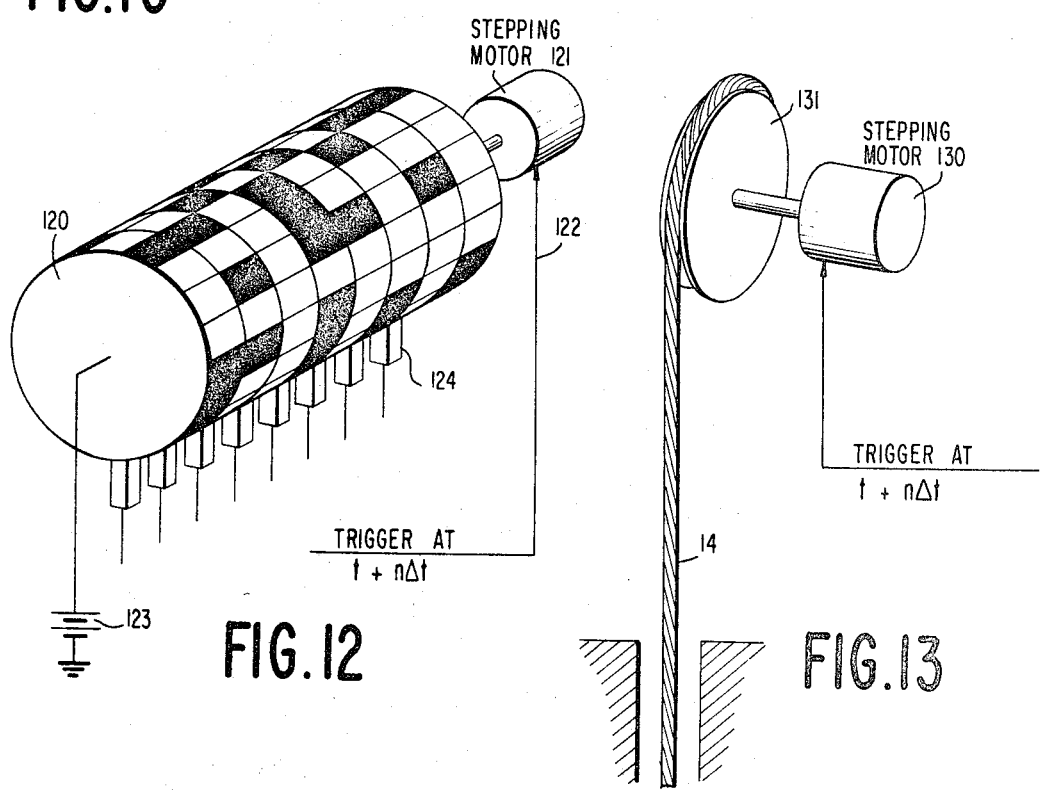

United States Patent Office 3,475,722
Patented Oct. 28, 1969

3,475,722
METHOD AND APPARATUS FOR ACOUSTIC BORE HOLE LOGGING USING ACOUSTIC SIGNALS OF CONTROLLED DIRECTION
James E. White, Littleton, Colo., assignor to Marathon Oil Company, Findlay, Ohio, a corporation of Ohio
Continuation-in-part of application Ser. No. 597,721, Nov. 29, 1966. This application Nov. 7, 1968, Ser. No. 777,988
Int. Cl. G01v 1/02, 1/16, 1/22
U.S. Cl. 340—15.5          14 Claims

ABSTRACT OF THE DISCLOSURE

Method and apparatus for acoustic bore holes logging using transducers for the transmission and reception of directional acoustic waves. Transducers, which may be used for transmission or reception waves, are arranged with three orthogonal elements. By pulsing each of the three elements in the transmitter transducer with a signal of selected magnitude and polarity, the direction of the transmitted waveform is chosen. Each of the elements in the receiver transducer receives that component of the returned waveform in the vector direction of the receiving element, thus separating the received waveform into its various components. The transmitter and receiver transducer elements are mounted in separate planes on a common housing to allow sequential transmission and reception from the same bore hole.

CROSS REFERENCE TO RELATED APPLICATION

This application is a continuation-in-part of my copending application No. 597,721, filed Nov. 29, 1966, now abandoned.

BACKGROUND OF THE INVENTION

Field of the invention

This invention relates in general to the art of well or bore-hole logging, and more particularly, to a novel acoustic logging technique and implementing apparatus.

Description of the prior art

The relatively young art of acoustic well logging generally involves the generation and transmission of acoustic signals (that is, vibratory waves of any frequency) through an earth formation under study and the reception of the signals at a point spaced from the transmitter. Knowing the distance between the transmitter and the receiver and the time required for an acoustic signal to travel that distance the velocity of sound in the formation may be calculated, from which many other useful determinations may be made which are indicative of the properties of the formation. The apparatus employed usually consists of spaced transmitting and receiving transducers mounted on a long housing that is lowered into a borehole filled with drilling mud and other fluids.

One of the greatest problems encountered in acoustic well logging arises from the fact that acoustic energy propagates in both shear and compressional modes, and the velocity of each mode depends on the propagating medium. Thus, the generation of a non-directioinal acoustic signal results in compressional waveforms on the drilling mud and shear and compressional waveforms in the borehole casing, if present, and in the surrounding earth formation, each waveform having a different velocity. These waveforms commonly interfere with each other at the mud, casing and formation interfaces. The result is that the composite waveform sensed at the receiver is a complex signal and it is therefore difficult, if not impossible, to accurately determine the time of arrival of a particular signal mode, for example, the mode in the formation. Most of the previous attempts to overcome this problem have accepted the existence and reception of a complex waveform and have been directed toward methods and apparatuses for extracting the desired signal components. These usually involve complicated analytical techniques and/or complex and extensive electronic circuitry, and the results are generally only good approximations.

Summary of the invention

The primary objects of this invention is therefore to provide a novel method and apparatus for acoustic well logging that overcomes the disadvantages inherent in the prior art systems as developed above. In general this aim is realized by generating acoustic signals in a manner which permits the selective exclusion, or at least the harsh suppression, of all undesired modes of propagation while at the same time emphasizing the desired modes. The resultant waveform that propagates through the formtaion therefore contains a strongly dominant mode or modes of the desired type and only very weak components of the undesired types, with the result that the dominant mode may be easily recognized or identified in the received waveform. In addition, the receiver is operated in such a manner that it responds primarily to signals in the desired mode or modes to the exclusion of all others, which further enhances the results.

It is a further object of this invention to provide a method and apparatus for acoustic well logging in which the force vectors generated by the transmitter transducers and sensed by the receiver transducers have selectively conrolled directions such that only the desired modes of propagation are emphasized.

It is a further object of this invention to provide such a method and apparatus in which the pressure or force vectors are transmitted and received by point force transducers that are in direct contact with the walls or cemented casing of a borehole, thereby suppressing fluid borne energy that would otherwise interfere with the desired modes of signal propagation.

It is a further object of this invention to provide an apparatus for generating force vectors and for receiving displacement vectors oriented in any selected direction in a three-dimension system. The transducer units employed to implement this function may take the form of three electromechanical transducer elements secured to a mounting block along mutually orthogonal axes whose intersection defines the point of physical contact with the wall or casing of the borehole. Since any vector in a three-dimensional system may be resolved into three orthoganal components, it is therefore possible to generate a force vector with such transducer units having any desired spatial orientation by simultaneously energizing the three transducer elements with current pulses having the proper magnitude and polarity.

The foregoing and other objects, features and advantages of the invention will be apparent from the following more particular description of a preferred embodiment of the invention, as illustrated in the accompanying drawings, in which:

BRIEF DESCRIPTION OF THE DRAWINGS

FIGURE 1 shows an acoustic logging tool embodying the principles of the invention in situ in a fluid filled borehole.

FIGURE 2 shows a perspective view of an individual transducer unit capable of generating or sensing a force in any given direction.

FIGURES 3A–3D show force vector diagrams for four of the possible modes of operation of the invention.

FIGURE 4 is an overall block diagram of an output system according to the present invention.

FIGURE 5 is a block diagram of an output unit for use in FIGURE 4.

FIGURE 9 is a schematic diagram of a variable amplifier for use in FIGURE 8.

FIGURE 10 is a schematic diagram of a polarity control unit for use in FIGURE 9.

FIGURE 11 is a schematic diagram of a signal combiner for use in FIGURES 7 and 8.

FIGURE 12 is a schematic diagram of a controller for controlling the vector modes of operation of the system.

FIGURE 13 is a schematic diagram of a stepping motor for controlling passage of the probe through the borehole.

DESCRIPTION OF THE PREFERRED EMBODIMENT

Figure 6:
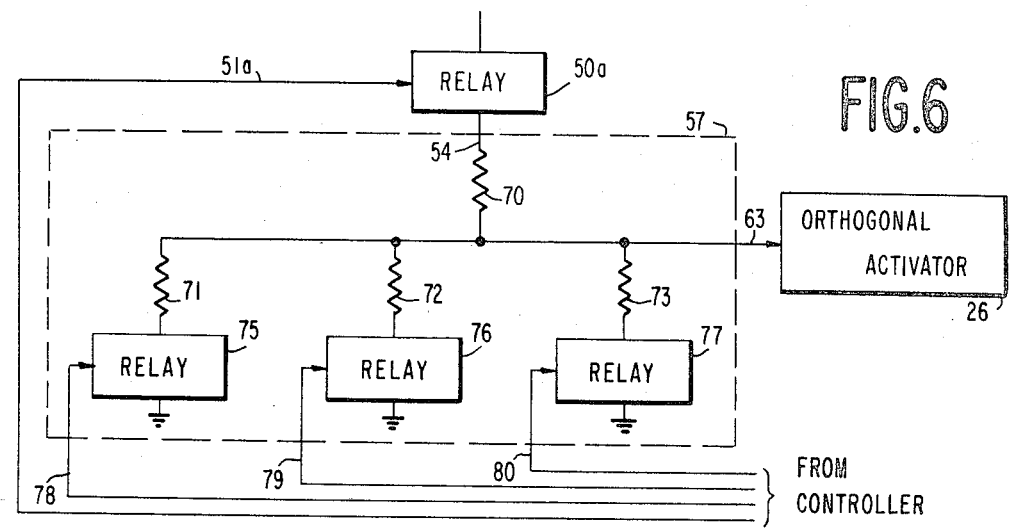
FIGURE 6 is a schematic diagram of a variable attenuator for use in FIGURE 5.

Referring now to the drawings, FIGURE 1 shows a logging tool 10 including a long, cylindrical housing 12 suspended by a cable 14 in a borehole 16 filled with drilling mud or fluid 18. The cable 14 both supports the logging tool 10 and carries all the necessary electrical wires for communicating with the tool. A plurality of transducer units 20 are pivotally mounted on the housing 12 by bracket arms 22 which urge the units into direct contact with the walls of the borehole 16 by means of bias springs within the housing (not shown). Each of the transducer units engages the borehole wall at only one point through a rigid contact button 24.

It is intended that the lower ring of transducer units be employed as a transmitter, while the two upper rings are used as receivers. Although only three transducer units are visible at each ring level or plane in FIGURE 1, it is understood that four such units are actually present, all being equidistantly spaced at 90° around the periphery of the housing 12. For ease of discussion, these four units will later be referred to as north, east, south and west units, although such orientation is not necessary and is for sake of discussion only. With an apparatus of this type several types of observation are possible. In one type the time required for signal generated at the transmitter ring to travel to either one of the receiver rings may be recorded, and knowing the spacing or distance between the rings the velocity may easily be determined. In another type the time for a transmitted signal to travel the distance between the two receiver rings may be measured, or if the signal is a continuous one, the phase difference between the two receiver rings may be detected. It is possible to determine the velocity of an acoustic signal using any one of these techniques, and the actual type of operation employed is unimportant for the purposes of the invention.

FIGURE 2 shows a perspective view of a single transducer unit capable of generating or sensing a force vector oriented in any given direction. Essentially, each transducer unit comprises three electro-mechanical transducer elements 26, 28 and 30 oriented along mutually perpendicular or orthogonal axes and securely attached to a metallic mounting block 32. The axes intersect at the contact button 24. The transducer elements may be piezo electric cylinders of barium titanate, magnetic coil and core assemblies, etc., and each one preferably carries a cap member 34 to act as an inertia weight or reaction mass. The electrical connections to each of the transducer elements are not shown for purposes of clarity. The mounting block 32 is in the form of a three-faced pyramid as might be obtained by cutting off the corner of a cube. The face carrying the contact button 24 is thus an equilateral triangle and the other three faces are all right isosceles triangles. The overall transducer assembly of FIGURE 2 is found within each one of the transducer units 20 of FIGURE 1, which are shown as including housings or containers through which the contact buttons 24 protrude.

Turning now to the operation of the logging apparatus shown in FIGURES 1 and 2, assume that the shear velocity of acoustic signals in the formations surrounding the borehole 16 is to be measured. By properly energizing the transmitter transducers of the lower ring the resultant forces imparted to the borehole wall through the contact buttons may be horizontally oriented and tangential to the borehole, as shown in FIGURE 3A. That is, by simultaneously pulsing each of the transducer elements 26, 28 and 30 in each of the transmitter transducer units with signals of selected magnitude and polarity, the point force vector generated by each transducer unit may be accurately controlled, and in this case is assumed to be as shown in FIGURE 3A. The relative signal weighting between the transducer elements required to produce such force vectors may be easily determined, and is dependent upon the orientation of each of the transducer assemblies within its housing.

The tangential force pattern of FIGURE 3A acts to twist or rotate the borehole 16 and thus sets up a shear wave which propagates through the formation. Since the force pattern is purely tangential and all of the force vectors act in the same relative direction, i.e. clockwise, no compression waves are created, and since these forces are applied directly to the walls of the borehole rather than being communicated through the drilling fluid, no strong fluid borne signals are developed.

To further enhance the results the signals produced by the individual transducer elements in the receiver transducer units due to sensed forces are combined in the same manner as the energizing signals for the transducer elements in the transmitter transducers are combined, which accentuates or stresses forces oriented in the same direction as the generated forces. Stated another way, the same relative signal weighting is employed in both the transmitter and receiver transducers, which renders the latter most responsive to the forces produced by the transmitter transducers while resulting in some cancellation of signals generated in the receiver elements due to extraneous or spurious modes of force propagation which may have arisen.

Contrary to what might be expected, it has been found that the technique just described is equally effective whether the borehole is cased or uncased. Although it would be expected that the signals will travel faster in the casing than in the formation and will arrive at the receiver ring or plane before the signals traveling through the formation, it has been found that such casing signals have only negligible strength, and that substantially all of the signal is transmitted through the rock. This technique is also effective to detect poorly cemented casings since in this case the acoustic signals will be decoupled from the formation and only the signals propagating through the casing will be detected at the receiver.

FIGURE 3B shows another force vector orientation which may be employed to measure shear velocity. With all of the forces acting in the same direction, the tendency is to bend or flex the borehole in the shear mode. Once again, the transducer elements in the receiver units would be connected in the same manner as the elements in the corresponding transmitter units to thus be primarily sensitive to the force vectors generated in the transmitter plane. By measuring shear velocity using the force vector orientations of both FIGURES 3A and 3B and comparing the results, a good check on the accuracy of the measurements may be obtained.

The radial force vector pattern of FIGURE 3C will produce both shear and compressional waves in much the same manner as a conventional transducer suspended in the center of the borehole and surrounded by fluid. Since the forces are applied directly to the walls of the borehole, however, rather than being coupled to the fluid, the amount of field borne energy is greatly diminished and the desired signal peaks in the sensed waveform are easily identifiable.

In FIGURE 3D the generated forces are parallel to the axis of the borehole which results in a strong compressional mode of signal propagation.

These are only four of the many possible force vector orientations which may be realized using the principles of this invention. Furthermore, it is to be understood that four transducer units have been shown at each transmitter and receiver ring by way of example only. In actual practice any number of such units may be employed, although some type of balanced array, i.e. equally spaced units, will probably produce the best results. The primary requirements are that the transmitted signals be unidirectional in a controlled manner rather than omnidirectional to stress or favor a desired mode of propagation, and that they be applied directly to the walls or cemented casing of the borehole to thereby suppress undesirable and interfering fluid borne energy.

A further advantage of the present invention is its ability to operate in any of the above described modes by adjusting the relative polarity and magnitudes of the electrical inputs to the individual transducers. Thus, with a single apparatus, torsional, compressional, and flexural signals can be produced at will.

Additionally, these various modes can be produced sequentially by manual or electronic switching. With suitable switching the modes can be changed with sufficient rapidity to produce an essentially continuous log in each of the modes during a single pass of the logging tool through the borehole.

FIGURE 4 is an overall block diagram of the system for providing pulses to the output transducers of the borehole logging apparatus. A monostable multivibrator 40 is periodically pulsed on input line 41 to cause the multivibrator to periodically generate output pulses of opposite polarity on output lines 42 and 43. The triggering of monostable multivibrator 40 takes place at intervals $\Delta t$, which may be present according to the length of time required for the vibrations from the previous pulsation of the borehole to decay substantially to zero. The triggering takes place at time $t+(n+k)\Delta t$, indicating that the pulsations take place beginning at an initial time $t+k\Delta t$ and continue at successive time periods, where $n$ is an integer as large as may be desired. The parameter $k$ indicates that the pulses take place a time interval $k\Delta t$ after the time $t+n\Delta t$. This timing will be of more interest when the trigger signal which occurs at time $t+n\Delta t$ is also considered.

The signals from lines 42 and 43 respectively pass through capacitors 44 and 45 onto lines 46 and 47. These lines provide pulses of opposite polarity to north output unit 48a, east output unit 48b, south output unit 48c, and the west output unit 48d. Controller signals from a controller shown in FIGURE 12 are provided to these output units on parallel lines 49, to control the magnitude and polarity of the output pulses from these units. The output units provide output signals to their respective output transducers.

FIGURE 5 is a block diagram of one of the output units, for example north output unit 48a. The input signals on lines 46 and 47 are applied to the inputs of relays 50a, 50b and 50c. Relays 50a, 50b and 50c are respectively controlled by signals on lines 51a, 51b and 51c from the controller to control which of the input lines 46 and 47 will be connected to their respective output lines 54, 55 and 56.

Lines 54, 55 and 56 provide input signals to digitally controlled variable attenuators 57, 58 and 59. Parallel lines 60, 61 and 62 respectively provide signals from the controller to attenuators 57, 58 and 59 to control the degree of attenuation of these devices. The outputs of attenuators 57, 58 and 59 are respectively on lines 63, 64 and 65. These output lines are connected to a three way output transducer 66 as illustrated in FIGURE 2, and more particularly to orthogonal activators 26, 28 and 30 as illustrated in FIGURE 2.

FIGURE 6 is a more detailed illustration of the digitally controlled variable attenuator, for example attenuator 57 as illustrated in FIGURE 5. The input signal on line 54 from relay 50a is connected to one end of a resistor 70. The other end of resistor 70 is connected to the junction of three resistors 71, 72 and 73. Together these resistors form a voltage divider with an output to orthogonal activator 26 on lines 63. Resistors 71, 72 and 73 are arranged to be connected to ground by relays 75, 76 and 77. Relays 75, 76 and 77 are respectively controlled by signals from the controller on lines 78, 79 and 80. First, the controller determines the voltage division ratio of the controlled variable atenuator 57, thereby controlling the amplitude of the output signal on lines 63.

Although only one controlled variable attenuator 67 has been illustrated in FIGURE 6, it is obvious that similar units could be used in blocks 58 and 59 of FIGURE 5. Also, although only one output unit has been illustrated in FIGURE 5, it is obvious that similar output units could be used in blocks 48a, 48b, 48c and 48d of FIGURE 4. The necessary elements for operation of the output transducers have been disclosed. The system for generating the controller signals will be explained later in connection with FIGURE 12.

Figure 7:
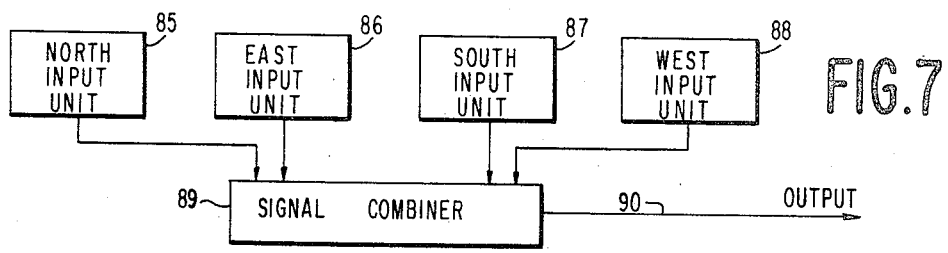
FIGURE 7 is an overall block diagram of an input system according to the present invention.

FIGURE 7 is an overall block diagram of the input transducer unit for receiving the acoustic signals and combining to produce an electrical output signal. North input unit 85, east input unit 86, south input unit 87, and west input unit 88 provide output signals to a signal combiner 89. The signal combiner combines the signals representing the various vectorial components of the acoustic signal and produces a corresponding combined electrical output signal on line 90.

Figure 8:
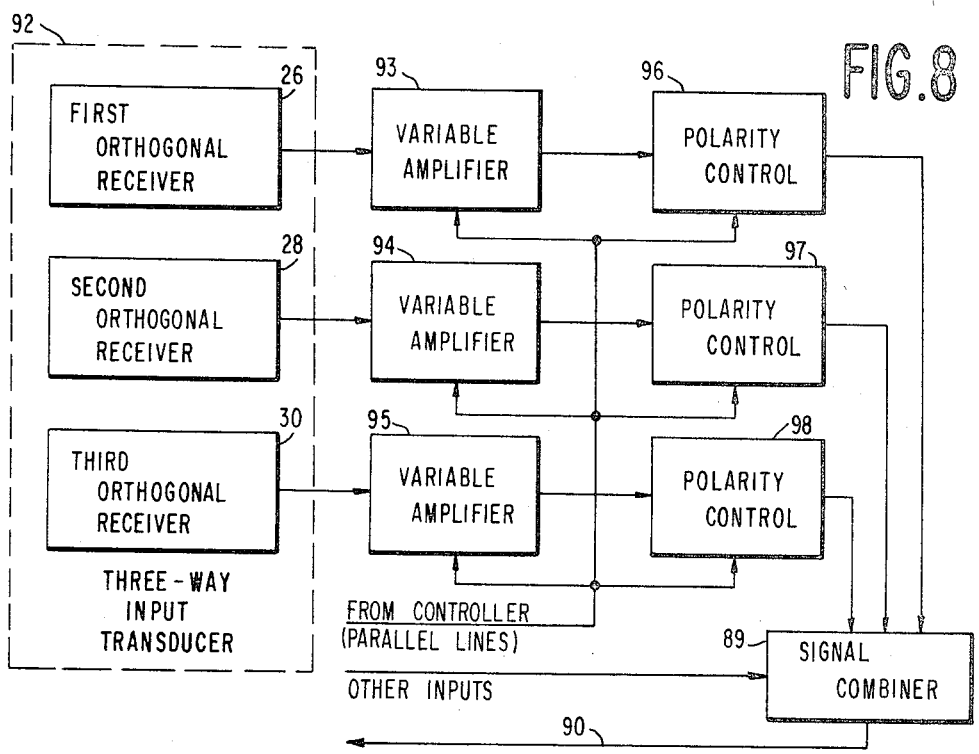
FIGURE 8 is a block diagram of an input unit for use in FIGURE 7.

FIGURE 8 is a block diagram of one of the input units, for example north input unit 85, shown connected to signal combiner 89. A three-way input transducer 92, more fully illustrated in FIGURE 2, contains three orthogonal receiver elements corresponding to elements 26, 28 and 30 as illustrated in FIGURE 2. The first, second and third orthogonal receiver elements respectively provide output signals through variable amplifiers 93, 94 and 95 and then through polarity control elements 96, 97 and 98 through the signal combiner 89. The variable amplifiers and polarity control elements are controlled by input signals from the controller, as will be more fully explained later.

FIGURE 9 is a diagram of a variable amplifier which may be used in connection with the present invention. An input signal on line 99 is amplified by amplifier 100 and applied to one end of a resistor 101. Resistor 101 is connected at its other end of the junction point of resistors 102, 103, and 104. These four resistors form a variable voltage divider, operating on the output signal from amplifier 100 to provide a variable output signal.

Relays 105, 106 and 107 are respectively connected to resistors 102, 103 and 104 to connect one end of preselected ones of these resistors to ground upon a signal from the controller. A variable signal, controlled by the controller signals to the variable amplifier is provided as an output on line 108.

FIGURE 10 is a diagram of a polarity control element for use with this invention. The input signal on line 108 from the variable amplifier is provided to a relay 109 through two paths. One of these paths is a direct path and the other path is through polarity inverter 110. A signal from the controller switches relay 109 to determine which of the two input signals to the relay will appear as an output signal on line 111.

FIGURE 11 is a diagram of a simple form of combiner which may be used with the present invention. Input signals from the various polarity control elements are provided through a set of input resistors 115 to a summing amplifier 116. The output signal from this summing amplifier on line 90 is the output from the system.

FIGURE 12 is a diagram of a controller element for use with the present invention. Many such controller elements could be used, and the illustrated controller is shown for purposes of example only. A drum 120 is rotated by a stepping motor 121, which is stepped by a periodic trigger signal on line 122. This trigger signal occurs at times $t+n\Delta t$. It will be seen from reference to FIGURE 4 that the trigger signal for stepping motor 121 occurs a time interval $k\Delta t$ before the monostable multivibrator 40 is triggered. This allows time for all switches to be in the appropriate position before the next output pulse is provided. Drum 120 is biased by a bias potential source 123. Around the surface of the drum are a number of circular paths having conductive and non-conductive paths alternating according to some predetermined pattern. Brush contacts, such as brush 124, track along these circular paths, being biased by bias potential source 123 when the area under the brush is conductive, and being non-biased when the area under the brush is non-conductive. The number of such brushes used is the number of necessary different controller signals needed. The drum can be pre-arranged according to numerous known preparation techniques to provide the controller signals in any desired combination and order. Because it is preferable for the input transducers to weight the magnitude and polarity of the received signals in the same manner as the magnitude and polarity of the transmitted signals were weighted, it is possible to use the same controller signal to control corresponding elements in the output and input transducers.

FIGURE 13 illustrates a system for moving the probe element through the borehole at a predetermined rate to allow continuous exploration of various sections of the borehole. A stepping motor 130 is triggered at successive times $t+n\Delta t$ to drive a wheel arrangement 131 to feed out or take up cable 14 attached to the probe. Other arrangements for moving the probe through the borehole could be used. One such arrangement would have a complete set of pulses according to FIGURE 12 provided for each position of stepping motor in FIGURE 13.

While the invention has been particularly shown and described with reference to a preferred embodiment thereof, it will be understood by those skilled in the art that various changes in form and details may be made therein without departing from the spirit and scope of the invention.

What is claimed is:
1. A method of acoustic borehole logging comprising the steps of:
 (a) simultaneously generating a plurality of acoustic signals each having a discrete directional orientation which may be represented by a force vector,
 (b) individually applying the signals directly to the walls of a borehole at points equally spaced from each other around the periphery of the borehole and lying in a first plane perpendicular to the axis of the borehole, and
 (c) sensing the propagated signals at a plurality of points on the walls of the borehole equally spaced from each other around the periphery of the borehole and lying in a second plane perpendicular to the axis of the borehole and spaced a known distance from the first plane, whereby the propagation time of the signals over the known distance may be measured from which their velocity may be calculated.

2. A method of acoustic borehole logging as defined in claim 1 wherein the force vectors representing the generated signals lie in the first plane and each one is tangent to the walls of the borehole in the same rotary direction, thereby tending to twist the borehole in a shear mode.

3. A method of acoustic borehole logging as defined in claim 1 wherein the force vectors representing the generated signals lie in the first plane and are all oriented in the same linear direction, thereby tending to flex the borehole in a shear mode.

4. A method of acoustic borehole logging as defined in claim 1 wherein the force vectors representing the generated signals lie in the first plane and each one is outwardly directed perpendicular to the walls of the borehole, thereby tending to radially expand the bore hole in both shear and compressional modes.

5. A method of acoustic borehole logging as defined in claim 1 wherein the force vectors representing the generated signals are perpendicular to the first plane and have the same linear direction, thereby tending to axially compact the borehole in a compressional mode.

6. A method of acoustic borehole logging as defined in claim 1 wherein the propagated signals are sensed in the same discrete direction of orientation that characterizes the generated signals.

7. An acoustic borehole logging transducer unit for generating or sensing a directional acoustic signal having any desired spatial orientation, comprising:
 (a) a mounting block, and
 (b) three transducer elements rigidly secured to the mounting block along mutually perpendicular axes whose common intersection lies at a point on the surface of the block, whereby a directional acoustic signal having any desired spatial orientation may be generated at the point by simultaneously energizing the elements with electrical signals of the proper magnitude and polarity or sensed at the point by combining the outputs from the elements in a prescribed manner.

8. An acoustic borehole logging transducer unit as defined in claim 7 further comprising inertia weights rigidly attached to each of the transducer elements.

9. An acoustic borehole logging transducer unit as defined in claim 8 wherein:
 (a) each of the transducer elements has an axis along which acoustic signals may be generated or sensed and which is aligned with one of the mutually perpendicular axes, and
 (b) the center of gravity of each inertia weight lies on the axis of its associated transducer element.

10. An acoustic borehole logging transducer unit as defined in claim 7 further comprising a switching means wherein a series of different directional acoustic signals having different spatial orientations can be generated sequentially by adjustment of said switching means.

11. The apparatus of claim 10 wherein suitable drive means is provided to cause the acoustic borehole logging transducer unit to move through the borehole and wherein automatic switching means is provided to cause the direction of the acoustic signal to vary in spatial orientation as the acoustic borehole logging transducer unit moves through the borehole.

12. An acoustic borehole logging transducer unit as defined in claim 11 wherein the switching of signals of varying spatial orientation is accomplished with sufficient rapidity to produce an essentially continuous log for each of the various spatial orientations.

13. A method of acoustic borehole logging as defined in claim 1 wherein the directional orientation of polarity of a series of acoustic signals is varied sequentially.

14. A method of claim 13 wherein the borehole logging tool is moved through a borehole while the directional orientations of the acoustic signals are varied with sufficient rapidity so as to produce a substantially continuous log of each of the directional orientations of the acoustic signals.

References Cited

UNITED STATES PATENTS 3,376,950   4/1968   Grine _____ 340—15.5 X

RODNEY D. BENNETT, Jr., Primary Examiner

C. E. WANDS, Assistant Examiner

U.S. Cl. X.R.

181—.5

PO-1050
(5/69)

UNITED STATES PATENT OFFICE
CERTIFICATE OF CORRECTION

Patent No. 3,475,722     Dated Oct. 28, 1969

Inventor(s) James E. White

It is certified that error appears in the above-identified patent and that said Letters Patent are hereby corrected as shown below:

Col. 1, line 64:  "non-directioinal" should read --non-directional--

Col. 1, line 65:  "on" should read --in--

Col. 2, line 9:   "the mode in" should read --the shear mode in--

Col. 2, line 31:  "type" should read --types--

Col. 5, line 19:  "field" should read --fluid--

Col. 5, line 58:  "present" should read --preset--

Col. 6, line 48:  "combining to produce" should read --combining them to produce--

SIGNED AND SEALED
OCT 13 1970

(SEAL)
Attest:

Edward M. Fletcher, Jr.
Attesting Officer

WILLIAM E. SCHUYLER, JR.
Commissioner of Patents